Patented Aug. 17, 1948

2,447,361

UNITED STATES PATENT OFFICE 2,447,361 dl-N-CYCLOHEXYLACETYLSERINE HEXAHYDROBENZYL AMIDE

Robert L. Peck, Plainfield, Stanton A. Harris, Westfield, Ralph Mozingo, Elizabeth, Donald E. Wolf, Rahway, and Karl Folkers, Plainfield, N. J., assignors to Merck & Co., Inc., Rahway, N. J., a corporation of New Jersey No Drawing. Application December 20, 1945, Serial No. 636,257

1 Claim. (Cl. 260—557)

This invention relates to certain new chemical compounds and to processes by which they may be prepared. More particularly, it relates to the new chemical compound, cyclohexylacetylserine hexahydrobenzylamide, and to methods by which this compound may be prepared from readily available starting materials. Cyclohexylacetylserine hexahydrobenzylamide is of value in the preparation of penicillin and substances possessing antibiotic action similar to that of penicillin.

In preparing the new chemical compound it is possible to start with serine. For example, dl-serine may be treated with phenylacetyl chloride to form dl-N-phenacetylserine. Reacting this compound with diazomethane results in the formation of the methyl ester of dl-N-phenacetylserine. The methyl ester is then reacted with benzylamine to form the benzylamide of dl-N-phenacetylserine. Hydrogenation with hydrogen in the presence of a catalyst then results in the desired compound, dl-N-cyclohexylacetylserine hexahydrobenzylamide.

As an alternative method, cyclohexylacetylserinehexahydrobenzylamide may be prepared from the benzylamine salt of the α-benzylamide of penicilloic acid G. The benzylamine salt of the α-benzylamide of penicilloic acid G may be prepared from available starting materials as follows: An ether solution of penicillin G (obtained by growing the organism Penicillium notatum #832 NRRL in a nutrient medium and extracting the medium with a suitable solvent such as amyl acetate) is treated with an excess of benzylamine. Almost immediately a crystalline precipitate is formed which is collected after about twenty-four hours. The crystalline product may be recrystallized from ethanol solution by the careful addition of ether to give the benzylamine salt of the α-benzylamide of penicilloic acid G, M. P. 135–136° C.

The benzylamine salt of the α-benzylamide of penicilloic acid G is treated with aqueous mercuric chloride. Hydrogenation with hydrogen in the presence of a catalyst yields cyclohexylacetylserine hexahydrobenzylamide.

Our improved processes for preparing the new chemical compound, cyclohexylacetylserine hexahydrobenzylamide, will be apparent from the examples given below which are to be regarded as illustrative, but not restrictive, of our invention.

EXAMPLE 1 dl-N-phenacetylserine

A solution of 52.5 g. of dl-serine (0.5 mole) and 70 g. of sodium hydroxide in 1500 ml. of water was prepared. One mole of sodium chloride was added and the mixture was cooled to —4° C. by means of a bath of dry ice in chloroform. Phenylacetyl chloride (prepared from 74.8 g. of phenylacetic acid (0.55 mole) and 70 ml. of thionyl chloride) was added dropwise to the serine solution, the reaction mixture being vigorously stirred and kept at —4° C. during the addition. After the acid chloride had been added, the mixture was stirred for an hour at —4° C. Concentrated hydrochloric acid (146 ml.) in 800 ml. of water was added to the stirred reaction mixture, the temperature being kept below 0° C. After all the acid had been added, the crystalline precipitate which separated was removed by filtration (13 g. dry weight) and the filtrate extracted twice with a total volume of 1 liter of ether. The ethereal solution contained 27 g. of phenylacetic acid. The aqueous solution after ether extraction was evaporated under reduced pressure to about one-half volume and seeded. A crystalline compound separated which melted at 126–130° C. After two recrystallizations from ether-petroleum ether, the N-phenacetylserine melted at 130–131°.

Partial analysis gave the following: Calcd. for $C_{11}H_{13}NO_4$: C, 59.18; H, 5.87; n, 6.27. Found: C, 59.64; 59.63; H, 6.13, 6.28; N, 6.03.

EXAMPLE 2 dl-N-phenacetylserine methyl ester

When 2.23 g. of phenacetylserine was treated with a slight excess of diazomethane, a vigorous evolution of nitrogen took place. Removal of the solvent left a viscous light yellow oil.

EXAMPLE 3

Benzylamide of dl-N-phenacetylserine dl-N-Phenacetylserine methyl ester (1.15 g.) was heated with 3 ml. of benzylamine on a steam bath overnight. After three or four hours some crystals appeared in the reaction mixture. The mixture was heated further for one hour at 120–125° C. After cooling, ether was added and the solid removed by filtration. This product weighed 0.8 g. A sample was recrystallized twice from methanol to give crystals of the benzylamide of dl-N-phenacetylserine, M. P. 159–160° C.

Partial analysis gave the following: Calcd. for $C_{18}H_{20}N_2O_3$: C, 69.29; H, 6.45; N, 8.97. Found:

C, 69.44, 69.32; H, 6.50, 6.72; N, 9.05

EXAMPLE 4 dl-N-cyclohexylacetylserine hexahydrobenzylamide

A solution of 61.9 mg. of dl-N-phenylacetylserine benzylamide in 90 ml. of methanol and 10 ml. of 2 N hydrochloric acid was reduced in the presence of 101 mg. of platinum oxide at atmospheric pressure. After 45 minutes absorption was complete and one molar equivalent of hydrogen had been absorbed.

The reduction mixture was filtered and the solution concentrated in vacuo until crystallization took place. The crystals of the dl-N-cyclohexylacetylserine hexahydrobenzylamide melted at 192–194° C.

Partial analysis gave the following: Calcd. for $C_{18}H_{32}N_2O_3$: C,66.63; H,9.94; N,8.63. Found:

C,66.83; H,9.97; N,8.70

EXAMPLE 5

*dl-N-cyclohexylacetylserine hexahydrobenzylamide*

About 264 mg. of the benzylamine salt of the α-benzylamide of penicilloic acid G in 36 cc. of water was treated with 2.41 cc. of saturated aqueous mercuric chloride (about 2.1 molar equivalents). A copious precipitate formed at once. An equal volume of pure (peroxide-free) dioxane was added causing the precipitate to redissolve. The solution was then treated with 200 mg. of Raney nickel catalyst and filtered. The solution was shaken with 200 mg. of platinum oxide under hydrogen. The platinum catalyst was removed and fresh catalyst added four times. One milliliter of concentrated hydrochloric acid was added along with the last portion of platinum oxide. After the absorption of hydrogen had ceased, shaking was stopped.

After removal of the catalyst by filtration, the filtrate was concentrated in vacuo to about one-third the original volume. Crystals separated at this stage of the concentration, and were removed; M. P. 171–173° C. After three recrystallizations from methanol, one from methanol-ether, two from acetone, and finally two from methanol-ether, the crystals melted at 192–194° C. (microblock, and were thus dl-N-cyclohexylacetylserine hexahydrobenzylamide.

Partial analysis gave the following: Calcd. for $C_{18}H_{32}N_2O_3$: C,66.63; H,9.94. Found:

C,66.95; H,10.32

It is obvious that various changes and modifications might be made in our procedures as described herein which would, nevertheless, be within the scope of our invention as defined in the appended claim.

We claim:

dl-N-cyclohexylacetylserine hexahydrobenzylamide.

ROBERT L. PECK.
STANTON A. HARRIS.
RALPH MOZINGO.
DONALD E. WOLF.
KARL FOLKERS.